(12) United States Patent
Bigus et al.

(10) Patent No.: US 7,136,843 B2
(45) Date of Patent: Nov. 14, 2006

(54) OBJECT-ORIENTED FRAMEWORK FOR REASONING HAVING PLUGGABLE INFERENCE ENGINES

(75) Inventors: Joseph Phillip Bigus, Rochester, MN (US); Jeffrey Robert Pilgrim, Rochester, MN (US); Donald Allen Schlosnagle, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 10/278,378

(22) Filed: Oct. 23, 2002

(65) Prior Publication Data

US 2004/0083454 A1 Apr. 29, 2004

(51) Int. Cl.
*G06F 17/00* (2006.01)
*G06F 15/18* (2006.01)

(52) U.S. Cl. .......................................... 706/52; 706/60

(58) Field of Classification Search ................... 706/52
See application file for complete search history.

(56) References Cited

OTHER PUBLICATIONS

IBM, Introduction to Able Rule Language (ARL),☐☐(http://www.research.ibm.com/able/doc/reference/com/ibm/able/rules/doc-files/arlindex.html), Oct. 16, 2001.*
Documentation: Readme for the Agent Building and Learning Environment, dated Jun. 30, 2003.

* cited by examiner

*Primary Examiner*—Anthony Knight
*Assistant Examiner*—Nathan H. Brown, Jr.
(74) *Attorney, Agent, or Firm*—F. Chau & Associates LLC

(57) ABSTRACT

A computer program product for implementing a rule-based programming language, the computer program product comprising a computer usable media, having computer program code thereon, comprises a single rule language supporting a plurality of rulesets, an object-oriented framework that compiles the rulesets into a collection of framework objects, and a plurality of pluggable inference engines for processing the collection of framework objects.

19 Claims, 11 Drawing Sheets

OBJECT-ORIENTED FRAMEWORK FOR REASONING HAVING PLUGGABLE INFERENCE ENGINES

BACKGROUND OF THE INVENTION

1. Field of the Invention

The present invention relates to data processing, and more particularly to the field of machine inferencing and reasoning.

2. Description of Prior Art

Since the advent of the first electronic computers in the 1940's, computers have expanded from performing complex numeric calculations, to processing increasingly complex symbolic programming languages (FORTRAN, COBOL, Pascal, C, C++, Java, etc.), to representing text, documents, images, and speech. During this same period, programming approaches have evolved from assembly language (binary machine code) to structured programming techniques, and finally to current object-oriented approaches as represented by the Smalltalk, C++, and Java programming languages. These programming languages require programmers to specify the sequences of operations necessary to perform the data processing functions of the application, and are called procedural languages.

In the late 1950's, efforts began to explore the application of computers to machine reasoning in an effort to duplicate the reasoning ability of humans. This so-called artificial intelligence programming field produced several new languages, notably Lisp and Prolog, as well as an entirely different approach to programming, called declarative. In declarative programming, the data processing functions are specified by sets of if-then rules (the knowledge), sets of data to be processed, and a control program called an inference engine. Traditionally, the format and representation of the rules were tightly joined and tailored to the underlying inference engine. For example, Prolog, based on predicate logic, uses a unique syntax and a corresponding backchaining or goal-oriented inference strategy using backtracking. A popular forward chaining or data-driven inference approach uses a sorting network (Rete' network) popularized in the OPS/CLIPS rule languages. IBM developed a forward chaining product based on the PL/1 programming language, called KnowledgeTool in the late 1980s.

A more recent use of rules engines is in the processing of so-called business rules. Companies such as ILog and Blaze offer software products with tightly coupled rules languages (syntax) and inference engines. These inference engines allow business applications to externalize business logic and business policies by representing the logic as rules. Many of these products allow users to mix traditional application-code (written in C, C++, Cobol, Java, etc.) with their rule-based processing.

Inference engines are typically tied very closely to the knowledge representation. It is difficult or impossible to replace an inference engine in other systems of this type. Thus, as more function is provided, the inference engine gets heavier and more complex and therefore performance for smaller problems degrades.

Another problem in the prior art is that it is difficult or impossible to mix multiple types of inference modules with procedural code. It is often the case that initialization or setup code which is mainly procedural is required to be intermixed with the processing and evaluation of declarative rules-based knowledge.

Therefore, a need exists for an object-oriented framework for reasoning, having architecthed extension points for pluggable inference engines.

SUMMARY OF THE INVENTION

According to an embodiment of the present invention, a plurality of machine reasoning modules or inference engines can be processed against a single rule-based knowledge representation (rule language).

The specification of the single rule language allows a user to maintain a single repository of domain knowledge for use by the plurality of inference engines. The rule language allows knowledge to be applied across products and services and enables reuse of expensive explicit knowledge.

The single rule language is rich enough to represent the semantics for simple business if-then rules, for predicate logic based rules, and for pattern matching rules.

According to an embodiment of the present invention, a method and apparatus enables the use of an application specific inference engine. A software architecture allows alternative implementations of the inference engines to be plugged into the framework of the rule language through architected extension points. This allows the use of light-weight engines for cases where, for example, real-time performance is important, or use of artificial intelligence reasoning engines (such as Rete' network forward chaining and Prolog depth-first search with backtracking and unification) as needed by more complex applications.

The present invention introduces the notion of a rule block where a set of rules is specified to be processed by a specific inference engine. Moreover, the present invention allows specification of multiple rule blocks, thereby providing the mixing of procedural rules using a Scripting inference engine with declarative rules processed by more traditional forward and backward chaining inference engines.

The rule language represents both procedural and declarative rule-based knowledge. In addition, an object-oriented software architecture allows multiple inference engines to be defined and selected for use in processing the rule-based knowledge.

According to an embodiment of the present invention, a computer program product for implementing a rule-based programming language, the computer program product comprising a computer usable media, having computer program code thereon, comprises a single rule language supporting a plurality of rulesets, an object-oriented framework that compiles the rulesets into a collection of framework objects, and a plurality of pluggable inference engines for processing the collection of framework objects.

Each framework object is a rule block comprising rules, wherein the rule block specifies an inference engine. Each rule is a declarative statement.

Each pluggable inference engine implements a control strategy to control the interpretation of rules.

The rule language comprises declarative representations and procedural knowledge representations.

Each ruleset is provided by one of an application programming interface of the object-oriented framework and an application program.

The object-oriented framework comprises an application programming interface for compiling rules from one of text and XML to object representations.

The object-oriented framework comprises an application programming interface for reverse-compiling rules from object representations to one of text and XML.

According to an embodiment of the present invention, a program storage device is provided, readable by machine, tangibly embodying a program of instructions executable by the machine to perform method steps for executing a collection of declarative and procedural statements. The method comprises instantiating a ruleset bean comprising at least one application programming interface, parsing a ruleset file according to the at least one application programming interface to create a plurality of framework objects, wherein at least one framework object is a rule block comprising a plurality of rules, and wherein the rule block specifies an inference engine, initializing the ruleset bean, and processing the framework objects and an input data according to the inference engine.

Parsing the ruleset file further comprises parsing a ruleset name, parsing an import statement, and parsing a library statement. Parsing the ruleset file further comprises parsing a variable statement, parsing an input/output section, and parsing the rule block comprising the plurality of rules.

Initializing the ruleset bean further comprises determining whether an init( ) rule block is defined, and upon determining that the init( ) rule block is defined processing the init( ) rule block, initializing each rule block, and creating an instance of an inference engine specified in a using-clause of the init( ) rule block. The method further comprises instantiating a working memory object.

Processing the framework of objects further comprises resetting the framework objects, and evaluating the rule block. The method comprises processing input variables. The method further comprises evaluating a preprocess rule block. The method comprises evaluating a postprocess rule block. The method processes output variables.

Processing the framework of objects further comprises determining whether a timer pops, and upon determining that the timer popped, evaluating, a processTimerEvent( ) rule block, and copying values of variables in an output list to an output buffer.

Processing the framework of objects further comprises receiving an event, evaluating a processEvent( ) rule block, and copying values of variables in an output list to an output buffer.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
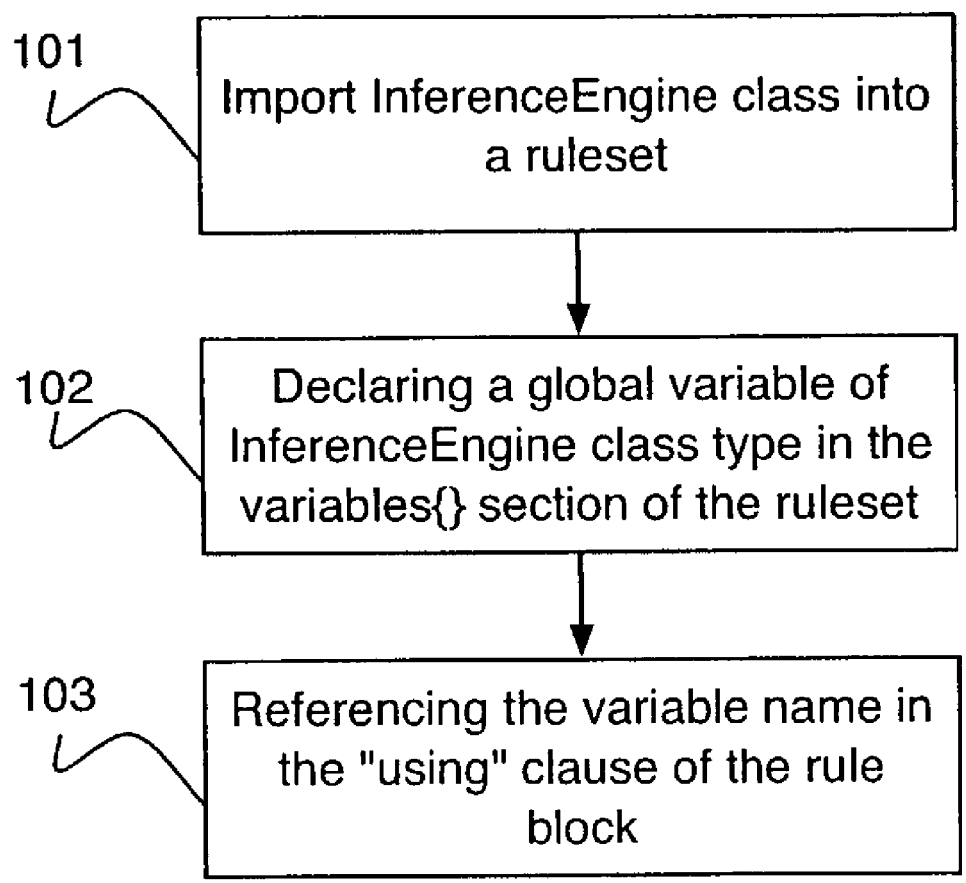
FIG. 1 is a flow chart of a method for coupling an inference engine to a framework according to an embodiment of the present invention.

A rule language according to an embodiment of the present invention is a rule-based programming language that can be integrated with Java objects while implementing artificial intelligence inferencing techniques. The rule language syntax follows the syntax and semantics of Java Object declarations and logical expressions. In Java, classes can be defined with data members and methods. Rule language rulesets, according to an embodiment of the present invention, can be defined with variables, rule blocks, and rules. The rule blocks comprise one or more rules. The rule language rulesets are compiled into framework objects and are processed by the specified inference engines.

A collection of rule language rules is a collection of declarative and procedural statements (data) that can be actively interpreted or processed by one or more inference engines. The rule language statements in a source ruleset can be compiled and turned into framework objects used as part of a ruleset bean. A bean is a term recognized by those skilled in the art of Java programming as referring to a Java object or software component. Ruleset beans can compile the rule language in text or XML documents.

Any text editor (or XML editor) can be used to create source rulesets. A ruleset editor can be provided to assist with this task. The ruleset editor provides a means to compile rulesets, and save the rulesets as serialized framework objects, as text documents, or as XML documents. The ruleset editor can also provide test and debug facilities. A WebSphere Studio-based editor can be implemented as an Eclipse plugin.

While the rule language is freeform, source rulesets have a definite structure. Rule language statements can be written to specify Java classes to access during inferencing and to load domain-specific function libraries. Variables can be defined, and rule blocks can be written, wherein the rule blocks are collections of rules that examine and manipulate the variables.

Depending on the inference engine used by the rule block, the rules can be processed sequentially or selected to be fired based on priority, specificity, or some other criterion. Rules can be written that invoke other rule blocks, allowing rules to be partitioned within a single ruleset and multiple inferencing strategies to be employed. Other rulesets can be invoked from a rule, thereby allowing for complex rule-based applications to be built using separate rulesets as the building blocks. Rules can also call out to arbitrary Java methods to receive values and invoke actions.

A rule is a declarative statement or knowledge expression, such as an if-then rule. Rule language statements are referred to as rules. Thus, different types of rules can be implemented, for example, assertion (assignment) rules, conditional (if-then) rules, if-then-else scripting rules, when-do pattern match rules, and while and do-while iteration rules.

Multiple rules can be grouped together into rule blocks. Each rule block can have an associated inference engine that interprets the rules in that block. This allows for mixing multiple inference techniques (for example, forward and backward chaining) with procedural scripts. The inference engines implement the control strategies that affect how the rules are interpreted.

Each inference engine is an interpreter of a group of rules (a rule block). Each inference engine implements an algorithm for deriving a result given a set of input data and the rules in the rule block. The inference engines can be used with rule language rulesets. These include, for example:

Script (procedural)—sequential evaluation of rules
Backward chaining—goal-chaining through if-then rules
Predicate backward chaining—goal-chaining with backtracking using predicate rules
Fuzzy forward chaining—multistep chaining over fuzzy if-then rules with linguistic variables and hedges
Forward chaining—data-driven inferencing over if-then rules
Forward chaining with pattern matching—data-driven inferencing over when/do rules
Forward chaining with pattern matching using a Rete' network—data-driven inferencing over when/do rules Referring to FIG. 1, an inference engine can be plugged into the framework (described with reference to FIGS. 2B to 9) by importing an InferenceEngine class (extending the InferenceEngine class of the framework) into the ruleset 101, declaring a global variable of that type in a variables { } section of the ruleset 102, and referencing the variable name in a "using" clause of a rule block 103. When the rule block is initialized, the engine variable will be deferenced and the underlying InferenceEngine object will be invoked to process the rules defined in that rule block.

Rule language rulesets can be compiled into Java objects and evaluated by the associated inference engines. While the rule language can be used as a scripting language, it can also provide dynamic inferencing or evaluation of rules.

Rule language files (rulesets) can be parsed on any system with a Java virtual machine. The rulesets can be saved in either text or XML documents with 100% equivalent semantics.

Rules can be used to manipulate the state of the ruleset and other rules. For example, each rule has an enabled flag that can be reasoned about and set by other rules. This can be used for enabling or disabling rules based on date and time or some other context. Each rule has a priority value that can be set by other rules.

The rule language can use a subset of the Java language syntax.

A ruleset bean can be used as a standard Java object using the process( ) method to run on a caller's thread or the rule language bean can be configured to run on it's own thread of control.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 2A:
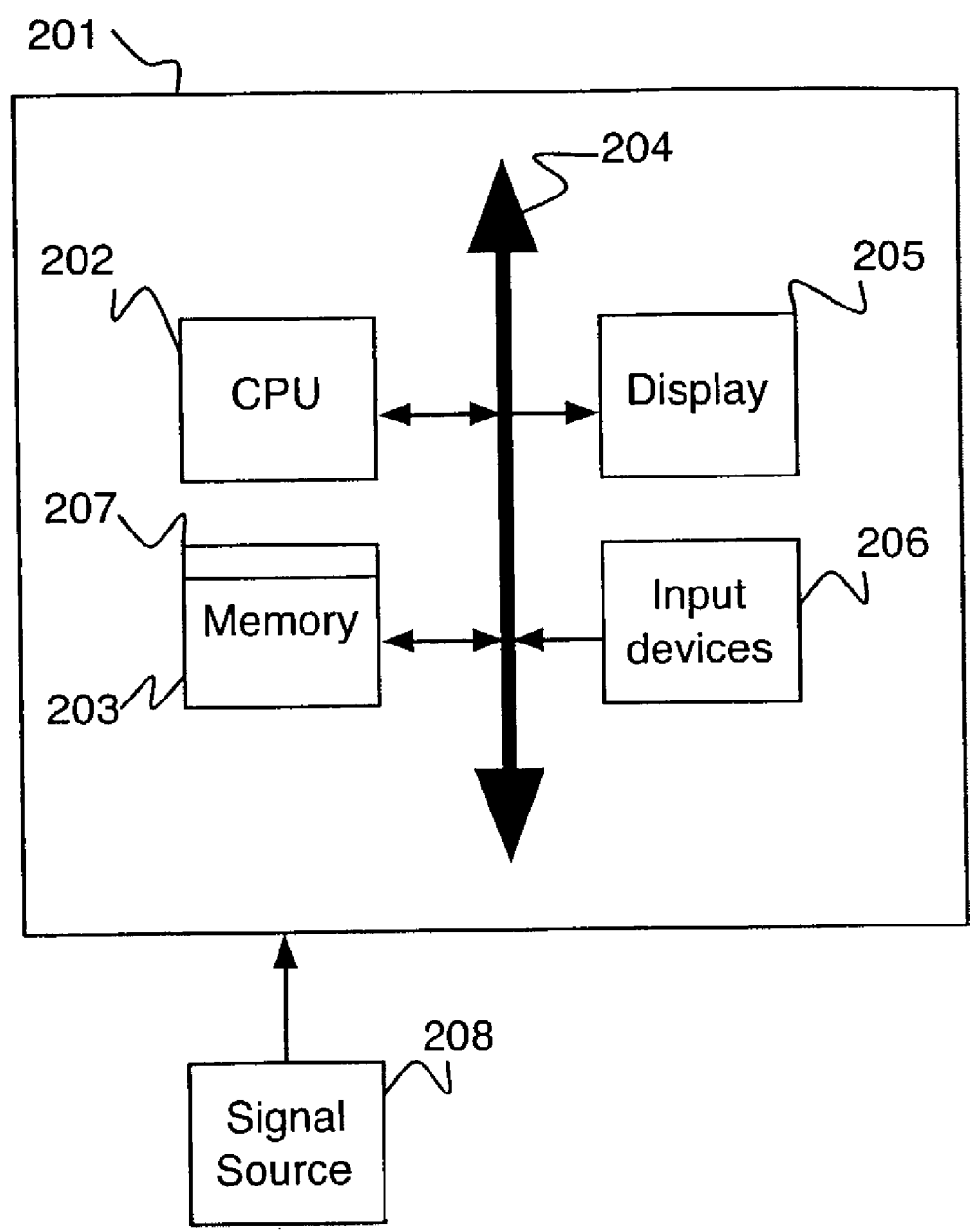
FIG. 2A is a block diagram of a system according to an embodiment of the present invention.

Referring to FIG. 2A, according to an embodiment of the present invention, a computer system 201, for example, a personal computer or personal digital assistant (PDA), for implementing the present invention can comprise, inter alia, a central processing unit (CPU) 202, a memory 203 and an input/output (I/O) interface 204. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the CPU 202 to process the signal from the signal source 208. As such, the computer system 201 is a general purpose computer system that becomes a specific purpose computer system when executing the routine 207 of the present invention.

The computer platform 201 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2B:
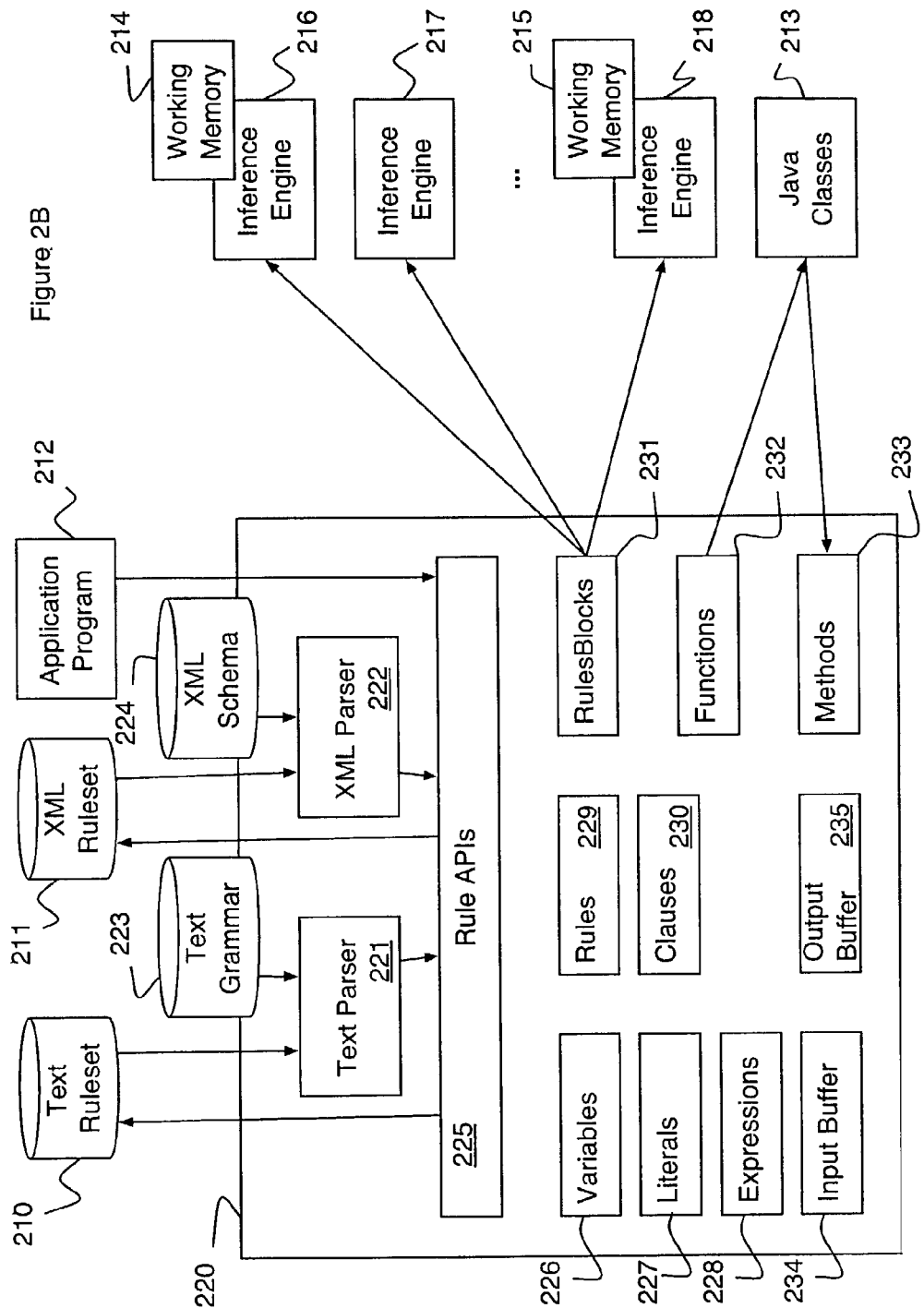
FIG. 2B is a block diagram of an example framework mechanism according to an embodiment of the present invention.

Referring to FIG. 2B, a ruleset bean 220 provides a plurality of application programming interfaces (APIs) 225 for exercising the functions provided by a framework of objects. The APIs 225 include, for example, a rule language text parser 221, which in turn uses a rule language text grammar 223, and a rule language XML parser 222 that makes use of a rule language eXtensible Markup Language (XML) XML Schema 224. The Antlr compiler generator can be used for the text parsing and the Xerces XML parser can be used for the XML parsing. Alternative compilers exist for both functions. The text parser 221 and the XML parser 222 make use of the APIs 225 to create the instances of the objects that make up the internal data representation of the rulesets. Object types include, for example, variables 226, literals (also known as data constants) 227, mathematical and logical expressions 228, rule objects 229, rule clauses 230, rule blocks 231, user-defined functions known as sensors and effectors 232, and method calls on imported classes 233. A text ruleset 210 comprises a set of rule language specifications, which can be parsed by the text parser 221 and compiled into a collection of objects, for example, variables 226, literals 227 and expressions 228. Using the APIs 225, these objects can be converted back into a text ruleset. An XML ruleset 211 comprises a set of rule language specifications, which can be parsed by the XML parser 222 and compiled into a collection of objects. Using the APIs 225, these objects can be converted back into an equivalent XML ruleset. An application program 212 can construct a ruleset and a collection of objects using the APIs 225 provided with the framework. A valid ruleset, whether parsed using the text parser 221 or the XML parser 222 or the APIs 225 results in the creation of an identical collection of objects, these three methods provide equivalent capabilities of defining and constructing the framework objects 226–233.

Referring yet again to FIG. 2B, Java classes 213 can be imported and used by rules in the ruleset. The Java classes 213 can include standard Java language classes such as java.lang.Math, java.util.Vector, etc., and application classes needed by the application.

The inference engines 216, 217, 218 in FIG. 2B comprise the inference modules provided by the framework and can include additional inference modules provided to extend the framework. These inference engines can optionally use working memory objects 214, 215 to hold instances of objects during inferencing. This flexibility can add enhanced or alternative inference modules (engines) to the framework. The design of the framework explicitly provides for this capability by separating the data (framework objects 226–233) from the inference or control modules (216–218).

Figure 3:
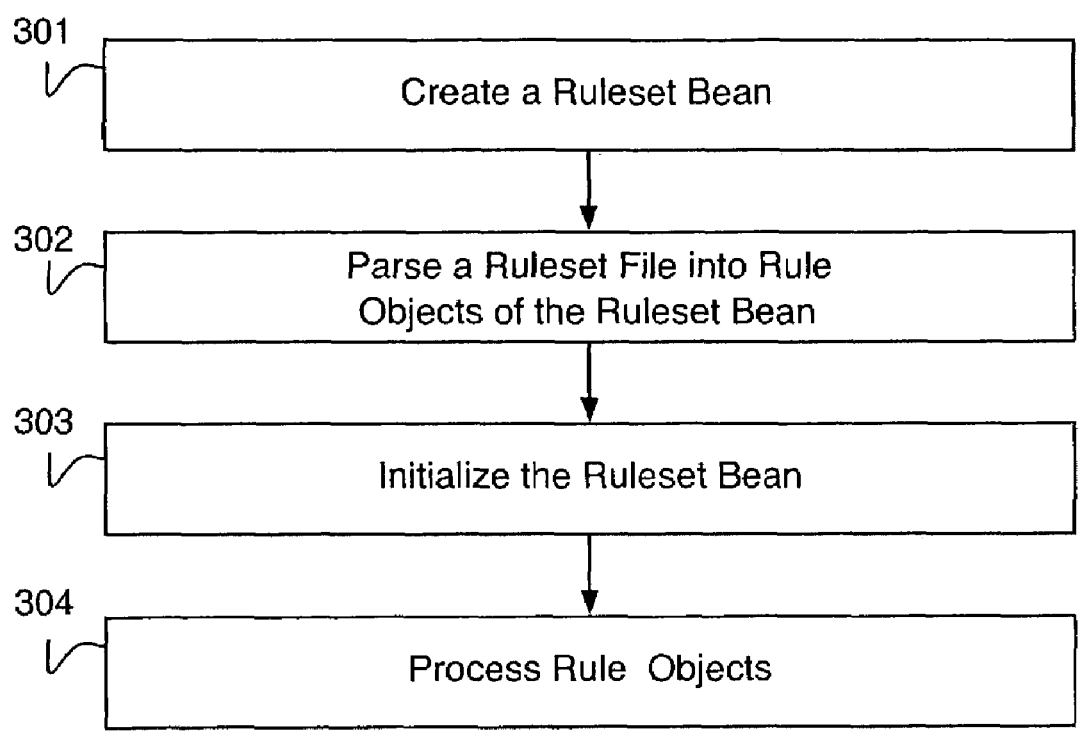
FIG. 3 is a flow diagram of the basic operations in the use of the framework mechanism according to an embodiment of the present invention.

Referring now to FIG. 3 and the implementation of the framework, at block 301 the ruleset bean 220 is instantiated, at block 302 the external text or XML ruleset file is parsed to create the framework objects 226–233. At block 303 the ruleset bean 220 is initialized, and at block 304 the framework objects 226–233 are used by the inference engines (216–218) to process input data.

Figure 4:
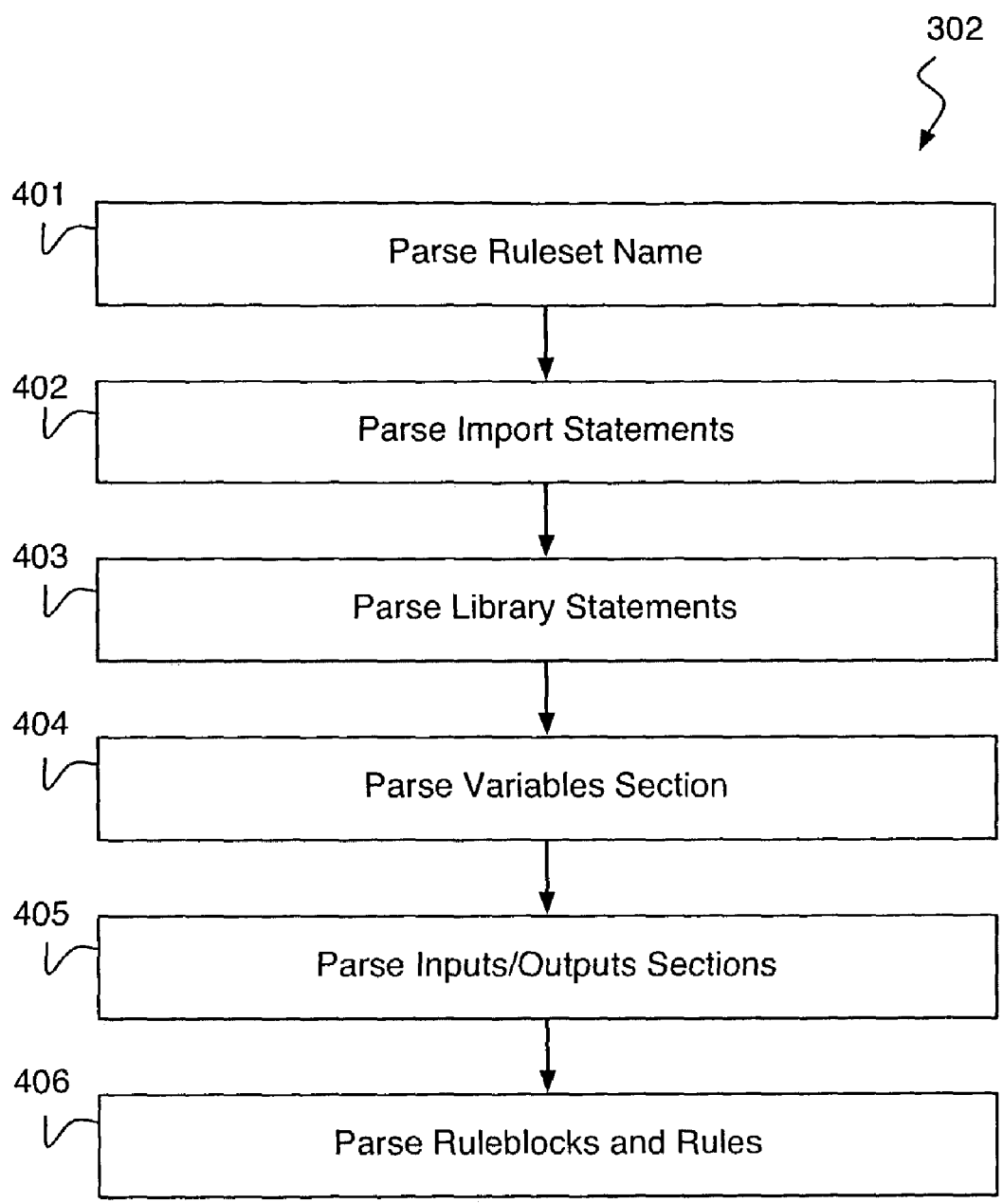
FIG. 4 is a flow diagram showing a method for performing parsing and compilation of rulesets according to an embodiment of the present invention.

Referring now to FIG. 4, in block 401 a ruleset name is parsed, wherein the ruleset name is an identifier that names the ruleset. At block 402 import statements are parsed. The import statements allow user defined data types for declaring and manipulating variables of those types. Each declared type needs to be equated to a public Java class. Library statements are parsed at block 403 and user-defined function objects 232 are constructed. Library statements allows the user to import public methods in specified classes (or libraries) as user-defined functions without needing to declare each method explicitly. Library functions then become available to be called from rules. At block 404 the variables section is parsed and a collection of variable objects 226 and literal objects 227 are instantiated. At block 405 the list of input and output variables are parsed. At block 406 one or more rule blocks are parsed, creating rule block objects 231, and rule objects 229 to be instantiated. A ruleset can have one or more rule blocks, and rules in one rule block can invoke rules in other rule blocks. Each rule block is processed by a corresponding inference engine specified by a "using" clause. As shown in FIGS. 2B & 4, the source text or XML ruleset have been converted into internal objects 226–233.

Figure 5:
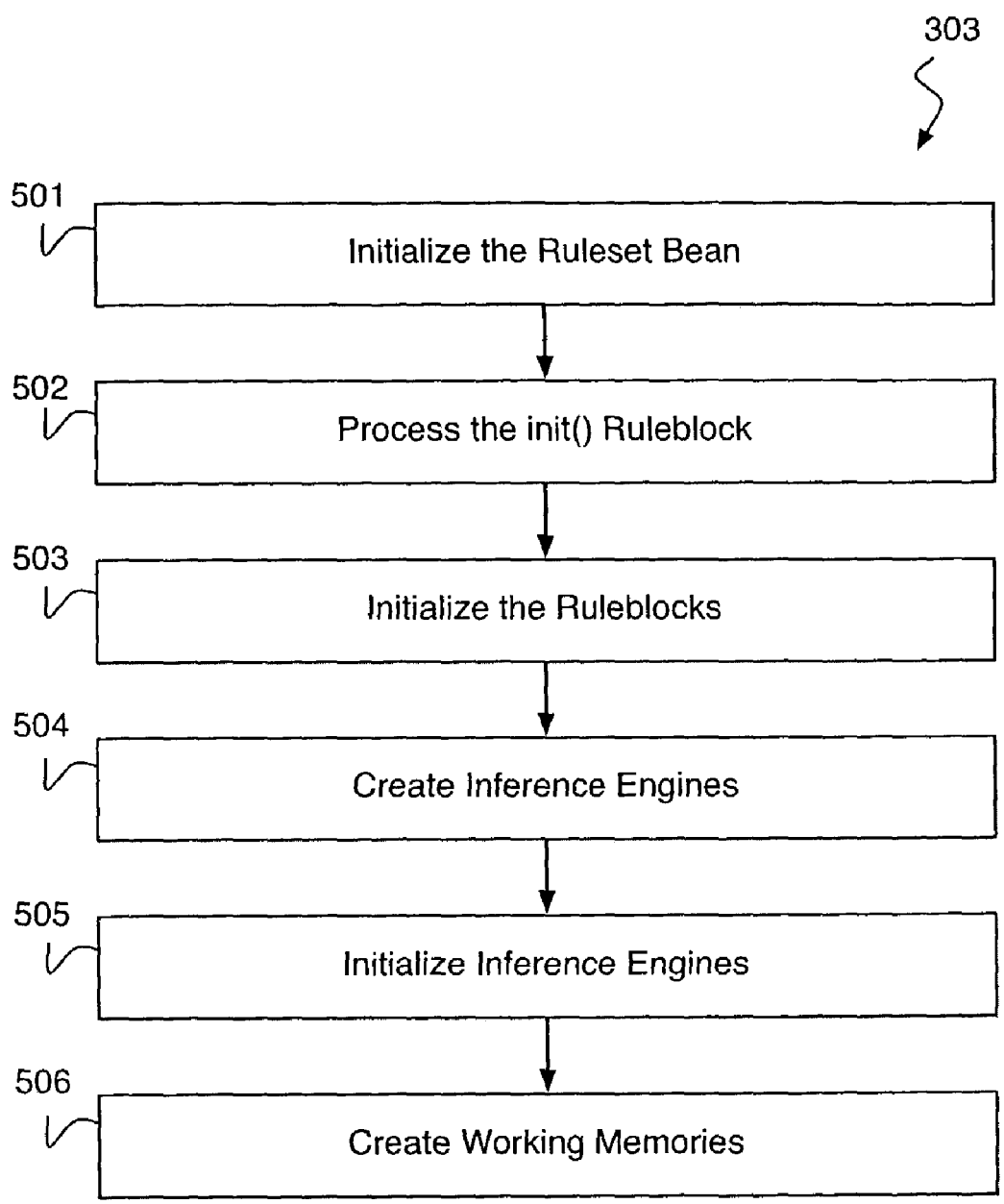
FIG. 5 is a flow diagram showing a method for initialization of framework objects according to an embodiment of the present invention.

Referring now to FIG. 5, at block 501 the ruleset bean object is initialized. At block 502 the init( ) rule block is processed if one has been defined. At block 503 each rule block is initialized in sequence. At block 504 an instance of the Inference Engine specified in the "using" clause is created and at block 505 this inference engine object is initialized. Operations can be transformations of rule objects into local data structures and instance variables used by the engine to process the rule objects. Depending on the type of inference engine associated with the rule block, a working memory object can be instantiated 506.

Figure 6:
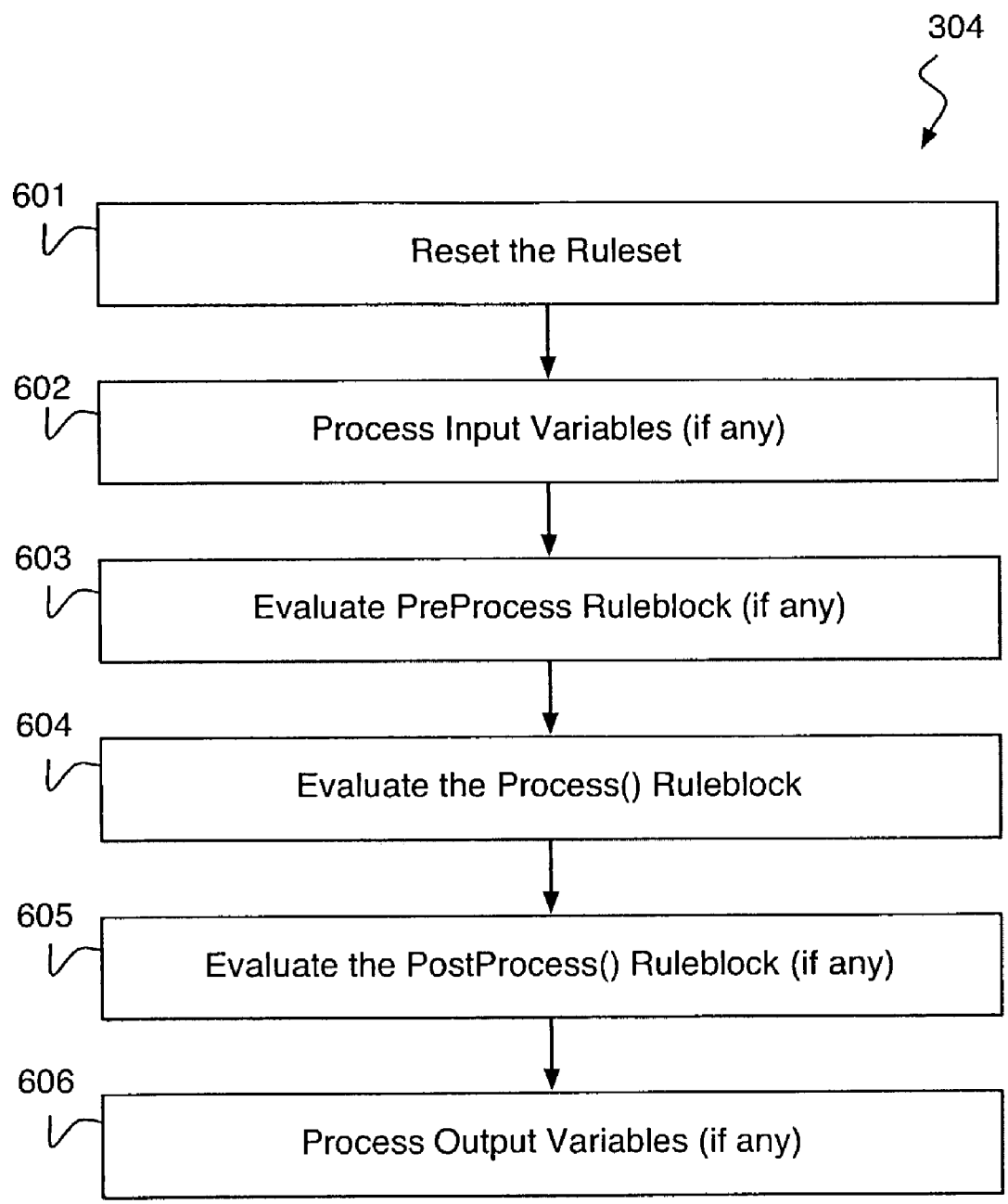
FIG. 6 is a flow diagram showing a method for processing of data passed using the input buffer according to an embodiment of the present invention.
Figure 7:
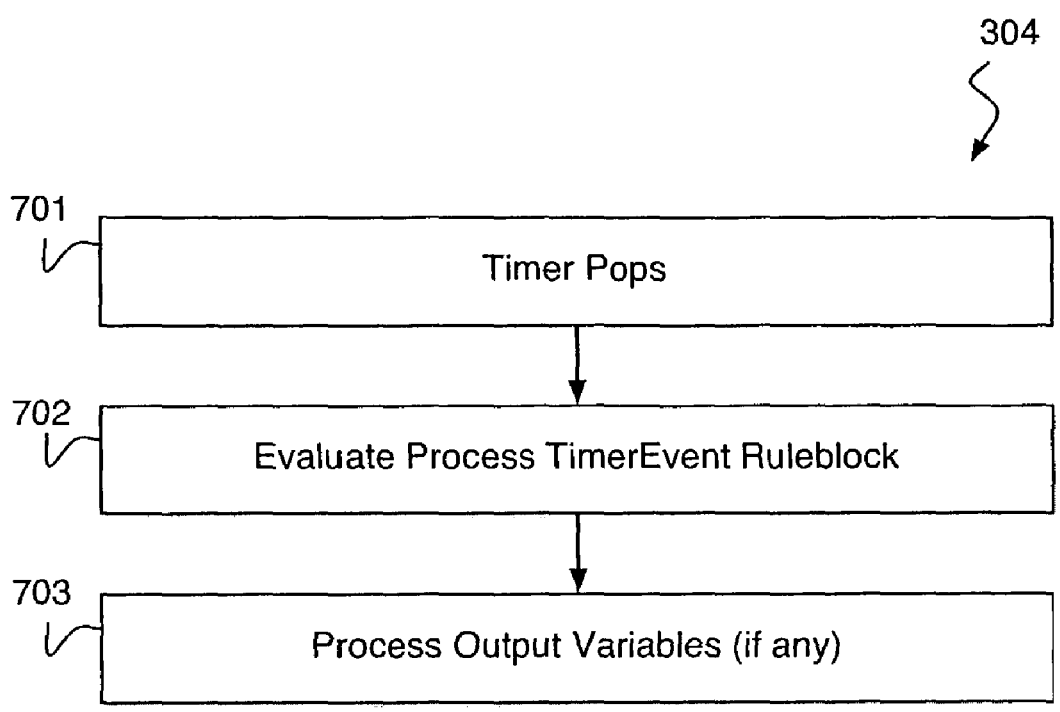
FIG. 7 is a flow diagram showing a method for processing of rules based on timer events according to an embodiment of the present invention.
Figure 8:
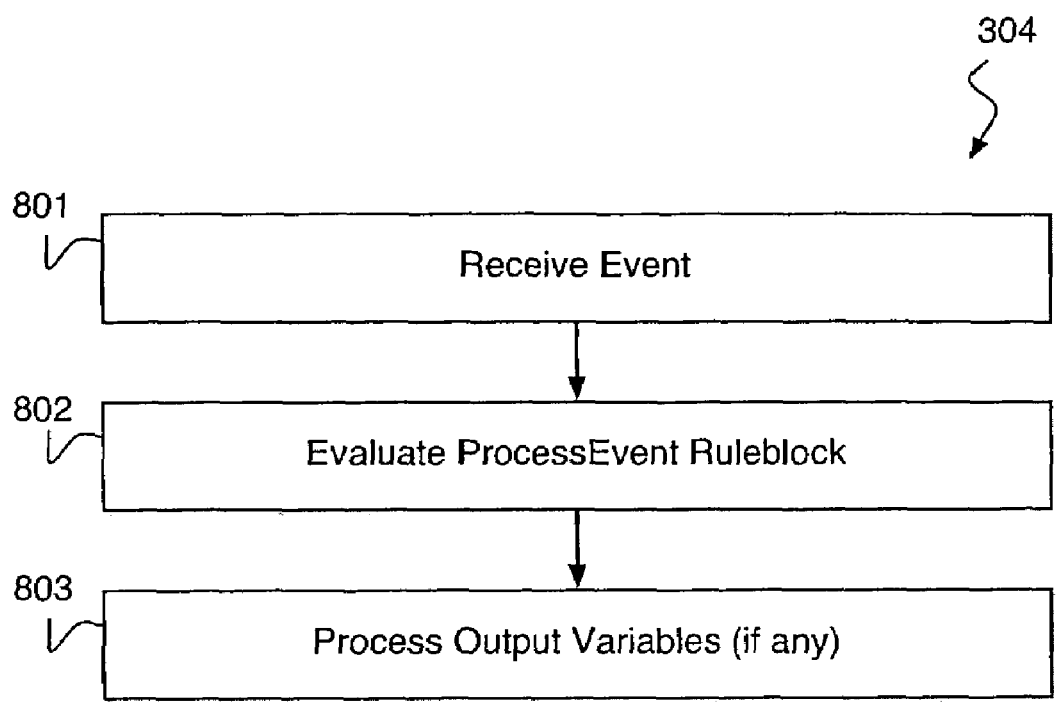
FIG. 8 is a flow diagram showing a method for processing of data based on received events according to an embodiment of the present invention.

FIGS. 6 through 8 illustrate three ways that a ruleset bean can be used to process rules and data. FIGS. 6 through 8 are examples and not intended to be limiting. Referring to FIG. 6, at block 601 the ruleset is reset, which comprises setting non-static variables back to initial values and clearing the rule fired flags on all rules. In block 602 data is copied from a ruleset bean's input buffer 234 (FIG. 2B) to corresponding variables as declared in the inputs{ } list. At block 603, any rules in the preprocess( ) rule block (if any were defined) are processed. At block 604 the rules in the main process( ) rule block can be processed. At block 605 any rules in the postProcess( ) rule block (if any were defined) are processed. At block 606 the values of variables in an output list are copied to an output buffer 235 (FIG. 1).

Referring now to FIG. 7, another example of a ruleset bean is shown. The ruleset bean is a bean that provides a timer function, wherein the bean cycles from a sleep mode to a wake-up mode every N milliseconds, where N is a variable. If the ruleset bean is configured in this mode, when the timer pops 701, a processTimerEvent( ) rule block is evaluated 702. The values of variables in the output list can be copied to the output buffer 703. This processing mode allows the ruleset bean to operate in an autonomous or fully-automatic mode enabling the framework to be used in autonomic and real-time policy enforcement applications.

Referring now to FIG. 8, the ruleset bean is a bean that provides support for processing events, either synchronously or asynchronously. If the ruleset bean is configured to process events, when an event is received 801, a processEvent( ) rule block will be evaluated 802. The values of variables in the output list can be copied to the output buffer 803.

Figure 9:
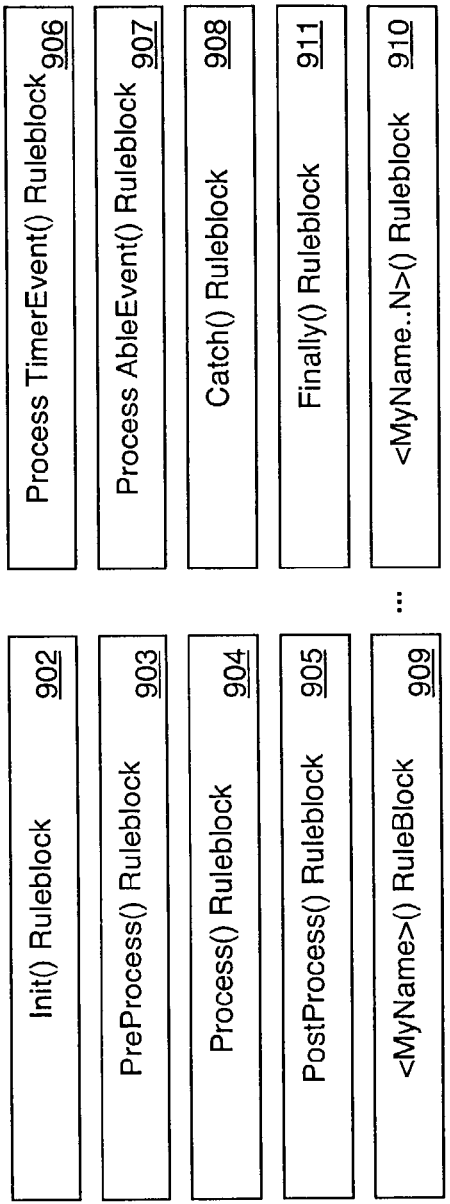
FIG. 9 is a block diagram of the structural elements of the rule language according to an embodiment of the present invention.

Referring now to FIG. 9, an example of a structure of a rule language or text ruleset 210 is shown. The ruleset can be divided into sections, for example, the data section 901, and the rules section 902–911. In the data section 901, an import statement (import <package>.class) allows a user to declare a single class to be used as a user-defined data type for variables and to allow method invocations on instances of the class. The library statement (library <package>.class), allows a user to declare a single class to be used as a library of user-defined functions. The variables section (variables{ }) can be used to declare one or more variables of the built-in data types or of one of the imported data types. These variables can have null values, constant values, or expressions. An optional predicates statement (predicates{ }) can be used to declare predicates to be used in rule blocks using a predicate inference engine. The functions statement (functions( )) can be used to declare individual user-defined functions that are then provided using the API 225. The inputs and output lists (inputs{ }/outputs{ }) can be used to declare variables that are to be bound to input buffer data and that are to be copied to the output buffer 235. Each ruleset maintains an input buffer 234 and an output buffer 235 through which data can be exchanged with other Java programs. A ruleset's input buffer 234 can be used to set the values of specific variables just before inferencing starts, and the output buffer 235 can be used to make the values of specified variables available to external code after inferencing is complete. Those defined variables that have their values set from and written to the buffers can be specified by using the inputs and outputs statements.

Again referring to FIG. 9, in the rules section, there are several rule blocks with predeclared names. These include the init( ) rule block 902, the preProcess( ) rule block 903, the process( ) rule block 904, the postProcess( ) rule block 905, the processTimerEvent( ) rule block 906 and the processEvent rule block 907, the catch( ) rule block 908, and the finally( ) rule block 911. The ruleset author can declare rulesets of any valid rule language identifier and these are depicted as items 909 and 910.

The following is an example of a text ruleset of the rule language. The particular syntax used in the example is not intended to be limiting and alternative syntaxes can be used to enable this function. The example demonstrates the use of the rule block elements and associated "using" clauses that allow each rule block to use a different inference engine.

```
ruleset HelloWorld {
    variables {
        String helloWorld = "Able rules!" ;
    }
    inputs{ };
    outputs{ };
    void process( ) using Script {
      Rule0: println(helloWorld);
    }
}
```

The following example illustrates how an enhanced or new type of inference engine can be specified for use in a framework according to an embodiment of the present invention.

```
ruleset HelloWorld2 {
    import com.myCompany.myEngineType ;   // plug-in the engine
    variables {
        String helloWorld = "Able rules!" ;
        myEngineType myEngine ;   // create an engine variable
    }
    inputs{ };
    outputs{ };
    void process( ) using myEngine {    // reference the engine
      Rule0: println(helloWorld);
    }
```

}

The following is an example of an XML ruleset.

```
<?xml version="1.0" encoding="UTF-8"?>
<AbleRuleSet
xmlns:xsi="http://www.w3.org/2001/XMLSchema-instance"
xsi:noNamespaceSchemaLocation="AbleRuleSet.xsd"
name="HelloWorld" comment="/** An ABLE RuleSet... */">
    <variables>
        <declareVar varName="helloWorld" comment=" "
dataType="String">
            <varInitializer>
                <stringLiteral value="Able rules!"/>
            </varInitializer>
        </declareVar>
    </variables>
    <inputs/>
    <outputs/>
    <ruleBlock block="process" dataType="void" comment=" ">
        <inference method="script"/>
        <rule label="Rule0" comment=" ">
            <assert>
            <expression>
                <null/>
                <noOperation/>
                <functionValue functionRef="println">
                    <argList>
                    <arg>
                      <variableValue varRef="helloWorld"/>
                    </arg>
                    </argList>
                </functionValue>
            </expression>
            </assert>
        </rule>
    </ruleBlock>
</AbleRuleSet>
```

The XML representation is semantically equivalent to the text ruleset representation and rulesets can be round-tripped from one representation to another using the APIs provided by the framework mechanism.

The following is an example of the syntax of rules in the rule language:

<ruleLabel>{preConditions}[priority]:<ruleBody>;

The "ruleLabel" is a unique identifier in the ruleset. The "preConditions" comprise a list of Java objects, e.g., Time-Periods. The "priority" can be used in conflict resolution during inferencing. The rule body needs to be one of the rule language rule types, for example:

mrRule{weekdaysOnly}[3.0]:println("wow");}

The syntax of the rule block statement in the rule language can be expressed as follows:

<type><name>( ) using<engine>{ruleList};

This is semantically equivalent to Java methods. A return data type can be specified. Predefined or user-defined names can be provided. There is no formal parameters list, however, global variables can be accessed. An inference engine for a rule block can be specified via the "using <engine>" clause. The body of the rule block comprises one or more rules. The built-in function "setControlParameter( )" can be used to set parameters on the associated inference engine, for example, goals and options. The rule block can have local or shared working memory.

The supported built-in data types in the rule language include, for example:
Boolean—Java Boolean
Byte/Short/Integer/Long—Java byte/short/int/long
Character—Java char (unicode value)
Double/Float—Java double/float
String—Java String
Object—java Object
Categorical/Discrete—set of Java Strings/doubles
Continuous—double with min/max limits
Fuzzy—linguistic variable with FuzzySets
TimeStamp—Java Calendar date/time object
TimePeriod—IETF compliant TimePeriod Conditions
Selector—query with constraints These built-in data types include the standard data types provided by the Java language with some additional types. Data types can be added or removed from this list as needed.

The inference engines or control modules provided with the framework mechanism include, for example:
Script—sequential or procedural processing
Fuzzy—multi-step forward chaining
Forward—data-driven chaining
Backward—goal-driven chaining
PatternMatch—Forward with working memory
PatternMatchRete—Forward with Rete' network
Predicate—backchaining with backtracking Additional or alternative implementations of these inference engines can be provided as needed.

Figure 10:
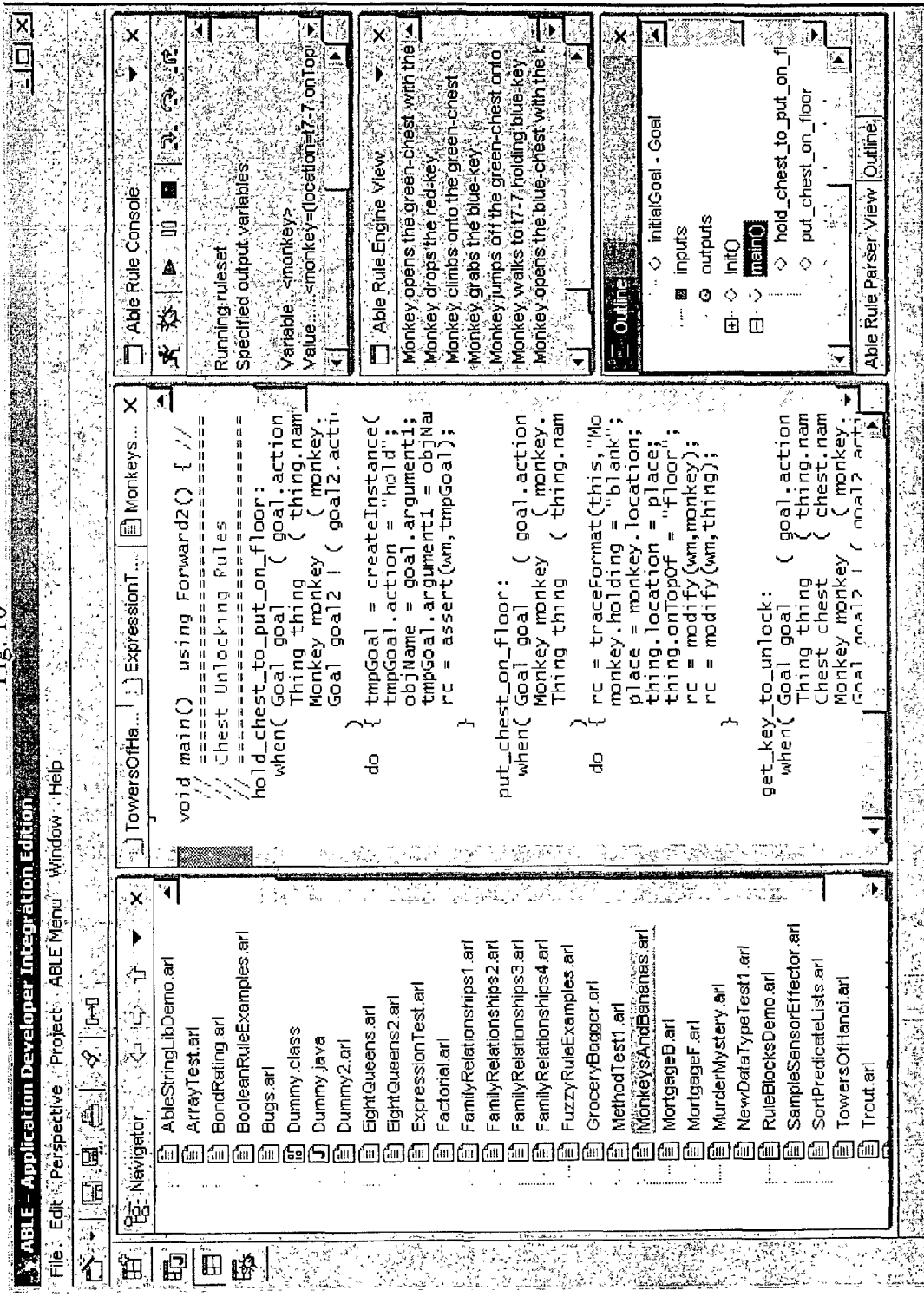
FIG. 10 is a screen capture of the rule authoring, test and debug environment of the preferred embodiment according to an embodiment of the present invention.

Referring to FIG. 10, an example of a display is shown for a rule authoring and debugging environment for the purpose of authoring, compiling and running either text or XML rulesets. The illustrated tool is the ARLEditor, which is provided as a WebSphere Studio plugin.

According to an embodiment of the present invention, the object-oriented framework can be the Agent Building and Learning Environment (ABLE) Rule Language and Editor developed by International Business Machines Corporation. The ABLE framework provides a set of Java interfaces and base classes used to build a library of JavaBeans called AbleBeans. The library includes AbleBeans for reading and writing text and database data, for data transformation and scaling, for rule-based inferencing using Boolean and fuzzy logic, and for machine learning techniques such as neural networks, Bayesian classifiers, and decision trees. Developers can extend the provided AbleBeans or implement custom algorithms. Rulesets created using the ABLE Rule Language can be used by inferencing engines. Core beans can be combined to create function-specific JavaBeans called AbleAgents. Developers can implement new AbleBeans and AbleAgents and plug them into ABLE's Agent Editor. Graphical and text inspectors can be provided in the Agent Editor so that bean input, properties, and output can be viewed as machine learning progresses or as values change in response to methods invoked in the interactive development environment. Application-level agents can be constructed from AbleBean and AbleAgent components using, for example, the ABLE Agent Editor or a commercial bean builder environment. AbleBeans can be called directly from applications or can run autonomously on their own thread. Events can be used to pass data or invoke methods and can be processed in a synchronous or asynchronous manner.

Having described preferred embodiments of an object-oriented framework for reasoning with pluggable inference engines, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer program product for implementing a rule-based programming language, the computer program product comprising a computer usable media, having computer program code thereon, comprising:
 a single rule language supporting a plurality of rulesets;
 an object-oriented framework that compiles the rulesets into a collection of framework objects; and
 a plurality of pluggable inference engines for processing the collection of framework objects.

2. The computer program product of claim 1, wherein each framework object is a rule block comprising rules, wherein the rule block specifies an inference engine.

3. The computer program product of claim 2, wherein each rule is a declarative statement.

4. The computer program product of claim 1, wherein each pluggable inference engine implements a control strategy to control the interpretation of rules.

5. The computer program product of claim 1, wherein the rule language comprises declarative representations and procedural knowledge representations.

6. The computer program product of claim 1, wherein each ruleset is provided by one of an application programming interface of the object-oriented framework or an application program.

7. The computer program product of claim 1, wherein the object-oriented framework comprises an application programming interface for compiling rules from one of text or XML to object representations.

8. The computer program product of claim 1, wherein the object-oriented framework comprises an application programming interface for reverse-compiling rules from object representations to one of text or XML.

9. A program storage device readable by machine, tangibly embodying a program of instructions executable by the machine to perform method steps for executing a collection of declarative and procedural statements, the method steps comprising:
 instantiating a ruleset bean comprising at least one application programming interface;
 parsing a ruleset file according to the at least one application programming interface to create a plurality of framework objects, wherein at least one framework object is a rule block comprising a plurality of rules;
 coupling a pluggable inference engine to the at least one framework object, wherein coupling includes,
  importing the pluggable inference engine into the ruleset bean,
  declaring a global variable of the pluggable inference engine in the ruleset bean, and
  referencing the global variable of the pluggable inference engine in the rule block of the at least one framework obiect;
 initializing the ruleset bean; and
 processing the framework objects and an input data according to the pluggable inference engine.

10. The method of claim 9, wherein the step of parsing the ruleset file further comprising the steps of:
 parsing a ruleset name;
 parsing an import statement;
 parsing a library statement;
 parsing a variable statement;
 parsing an input/output section; and
 parsing the rule block comprising the plurality of rules.

11. The method of claim 9, wherein the step of initializing the ruleset bean further comprising the steps of:
 determining whether an init( ) rule block is defined, and upon determining that the init( ) rule block is defined processing the init( ) rule block;
 initializing each rule block; and
 creating an instance of an inference engine specified in a using-clause of the init( ) rule block.

12. The method of claim 11, further comprising the step of instantiating a working memory object.

13. The method of claim 9, wherein the step of processing the framework of objects further comprises the steps of:
 resetting the framework objects; and
 evaluating the rule block.

14. The method of claim 13, further comprising the step of processing input variables.

15. The method of claim 13, further comprising the step of evaluating a preprocess rule block.

16. The method of claim 13, further comprising the step of evaluating a postprocess rule block.

17. The method of claim 13, further comprising the step of processing output variables.

18. The method of claim 9, wherein the step of processing the framework of objects further comprises the steps of:
 determining whether a timer pops, and upon determining that the timer popped, evaluating, a processTimerEvent( ) rule block; and
 copying values of variables in an output list to an output buffer.

19. The method of claim 9, wherein the step of processing the framework of objects further comprises the steps of:
 receiving an event;
 evaluating a processEvent( ) rule block; and
 copying values of variables in an output list to an output buffer.

* * * * *